United States Patent [19]
Jacklin et al.

[11] Patent Number: 5,838,969
[45] Date of Patent: Nov. 17, 1998

[54] SYSTEM AND METHOD FOR COLLECTING AND DISPATCHING SELECTED EVENTS IN A COMPUTER APPLICATION PROGRAM

[75] Inventors: Kelly Jacklin, San Francisco; Daniel Clifford, Palo Alto, both of Calif.

[73] Assignee: Apple Computer, Inc., Cupertino, Calif.

[21] Appl. No.: 644,704

[22] Filed: May 10, 1996

[51] Int. Cl.⁶ ............................. G06F 15/163; G06F 9/00
[52] U.S. Cl. ......................... 395/680; 395/670; 395/672
[58] Field of Search ........................... 395/680, 578, 395/705, 682, 670, 672, 557; 305/682

[56] References Cited

U.S. PATENT DOCUMENTS

| | | | |
|---|---|---|---|
| 5,075,847 | 12/1991 | Fromme | 395/705 |
| 5,355,484 | 10/1994 | Record et al. | 395/704 |
| 5,555,415 | 9/1996 | Allen | 395/680 |

*Primary Examiner*—Majid A. Banankhan
*Attorney, Agent, or Firm*—Carr & Ferrell LLP; Gregory J. Koerner

[57] ABSTRACT

A system and method for collecting and dispatching selected events in an application program comprises an application routine which registers selected events of interest to form a series of handler tables, an event manager which evaluates each new event as it occurs to determine whether any new events are registered in the series of handler tables, and a series of event handlers for responsively handling new events which are registered in the series of handler tables.

20 Claims, 7 Drawing Sheets

SYSTEM AND METHOD FOR COLLECTING AND DISPATCHING SELECTED EVENTS IN A COMPUTER APPLICATION PROGRAM

BACKGROUND OF THE INVENTION

1. Field of the Invention

This invention relates generally to computer systems and more particularly to a system and method for collecting and dispatching selected events in a computer application program.

2. Description of the Prior Art

Computer application programs perform jobs or functions through the use of a computer system. Computer users may thus choose different application programs to perform specific tasks such as word processing, generating spreadsheets or creating graphics. Many application programs respond to various "events" which occur outside of their actual application routine and which may be of interest to the application program.

Such events may typically be divided into at least three general categories: user input events, system messaging events and interapplication events. User input events are initially triggered by the system user (usually by manipulation of computer system hardware). These user input events include, but are not limited to, keystrokes on the system keyboard and system mouse clicks. System messaging events are messages to the application which are generated by the operating system (for example, a message for an application to quit because its memory space is needed for another application). Interapplication events communicate between coexisting applications (for example, a wordprocessor application requesting a spreadsheet application to perform a recalculation). These interapplication events include, but are not limited to, polling of concurrently-running applications and providing status reports.

Events also play an important role in application states known as "modalities." Applications may enter modal states in which the application program code can only respond to certain specific events. For example, an application may generate a user dialog box asking the system user a specific question. Until the question is answered, the application may be unable to respond to events which do not involve the specific interaction of the dialog block (e.g., print or quit commands). Therefore, in modalities, applications are interested in a subset of their normal events of interest.

Conventional applications typically poll the operating system to determine whether any events of interest have occurred. If an event of interest has occurred, the application then performs a series of typically work-intensive and time-consuming tasks to determine the event type and specific relevant details concerning the event. The application's continual polling of the operating system for events of interest generally results in a significantly lower operating efficiency for the computer application program. Therefore, an improved system and method is needed to collect and dispatch selected events in a computer application program.

SUMMARY OF THE INVENTION

In accordance with the present invention, a system and method are disclosed for collecting and dispatching selected events in a computer application program. In the preferred embodiment of the present invention, an application routine registers selected events of interest along with a pointer to a corresponding event handler to form a series of handler tables. The application routine then arranges the series of handler tables in a sequence to form a handler table stack.

An event manager identifies new events of interest as they occur and then sequentially examines each of the handler tables in the sequence to determine whether any of the new events are registered in the handler tables. If a new event is registered in the current handler table, then the event manager uses the corresponding registered pointer to invoke the appropriate event handler and thereby process the new event.

In contrast, if a new event is not registered in the current handler table, the event manager may proceed in two different ways. If the current handler table is a filtering type handler, then the event manager places the new event into a temporary queue for later processing. If, however, the current handler table is not of the filtering type, then the event manager sequentially examines each of the subsequent handler tables to determine if the new event may be registered in one of these other handler tables.

The application routine uses program instructions to selectively configure both the individual handler tables and the handler table stack. The application routine manipulates the contents of the handler tables by altering the registration of selected events and further manipulates the handler table stack by adding and/or removing tables to alter the predetermined sequence of handler tables.

The present invention permits an application program to selectively register events of interest. The present invention also supports various modalities in which an application can only respond to certain specific events. The present invention thus allows application programs to operate more efficiently by performing the work-intensive and time-consuming tasks involved in evaluating and handling events.

DETAILED DESCRIPTION OF THE PREFERRED EMBODIMENT

The present invention includes a system and method for collecting and handling selected events in which a computer application program registers various events of interest into a series of handler tables and then compiles the tables into a handler table stack. An event manager in the operating system then identifies new events as they occur and sequentially determines whether the new events are registered in the handler tables comprising the handler table stack. When a new event is registered, the application or the operating system then handles the event using a corresponding handling procedure designated within the handler tables.

Figure 1:
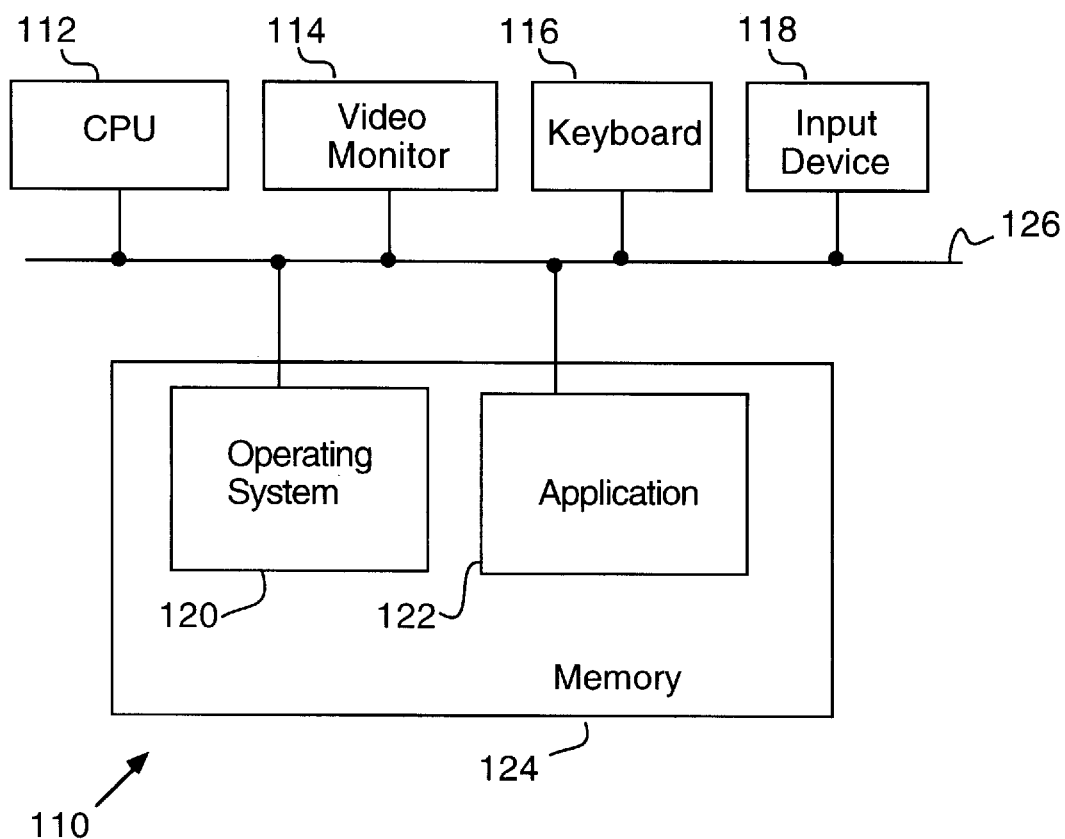
FIG. 1 is a block diagram showing a computer system for collecting and dispatching selected events according to the present invention.

Referring now to FIG. 1, a computer system 110 is shown for handling selected events according to the present invention. Computer system 110 preferably comprises a central processing unit (CPU) 112, a video monitor 114, a keyboard 116, an input device 118 (for example, a mouse) and a memory 124. Memory 124 contains an operating system 120 and at least one application program 122. Each element of computer system 110 preferably has an input and an output coupled to a common system bus 126. Memory 124 may alternately comprise various storage-device configurations, including Random-Access-Memory (RAM), Read-Only-Memory (ROM), and non-volatile storage devices such as floppy-disks and hard disk-drives. System bus 126 may alternately be connected to a communications interface to permit computer system 110 to output information to a computer network.

Figure 2:
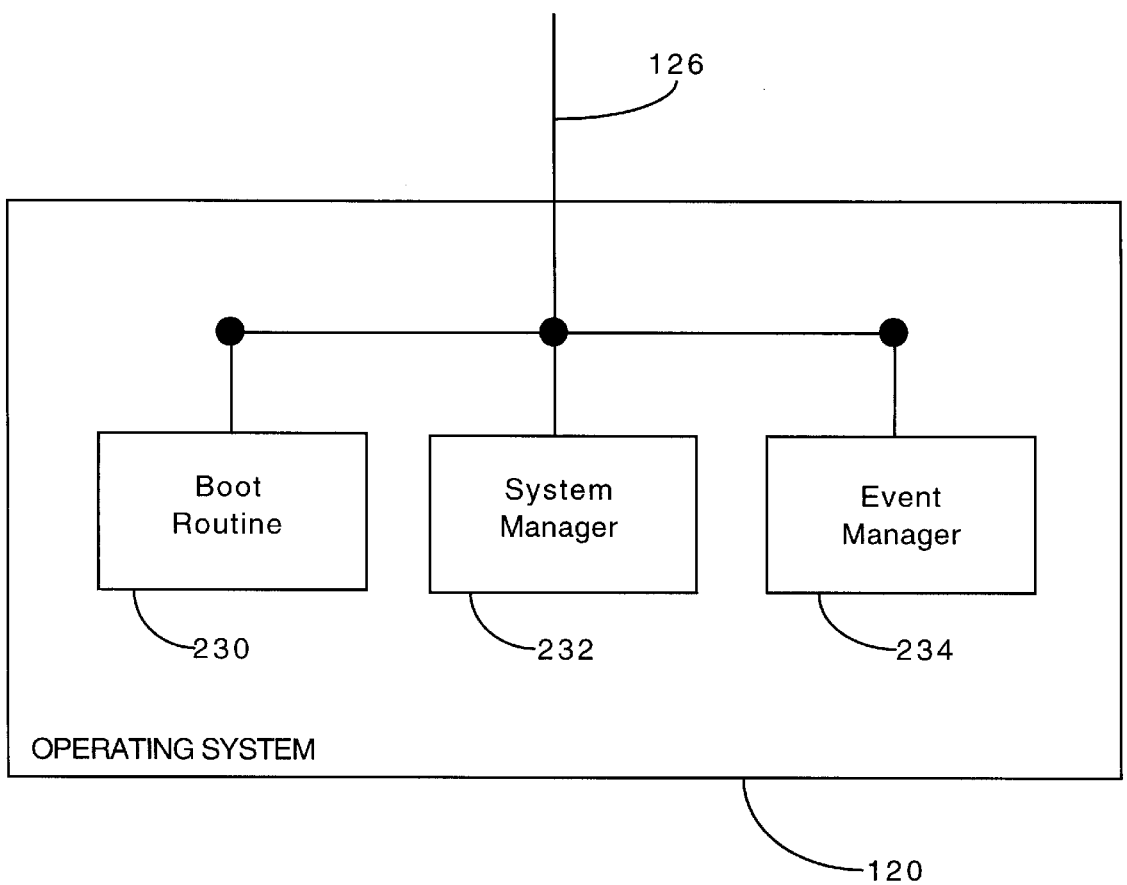
FIG 2 is a block diagram showing the preferred embodiment of the FIG. 1 operating system.

Referring now to FIG. 2, a block diagram of the preferred embodiment of operating system 120 is shown. Operating system 120 includes boot routine 230, system manager 232 and event manager 234. Boot routine 230 performs a start-up procedure which places computer system 110 into an initial operational state wherein system 110 is ready to begin normal computer operations. Once system 110 has entered this initial operational state, boot routine 230 then transfers control to system manager 232 which subsequently coordinates and manages the normal operations and functions of computer system 110.

Event manager 234 coordinates and manages the process of selectively dispatching any events of interest to a corresponding application 122 event handling procedure. In the preferred embodiment, events of interest typically may include user input events, system messaging or interapplication communications. In alternate embodiments, events of interest may also include various other activities which affect application 122 and/or system 110. Event manager 234 is an engine which is capable of receiving and dispatching the events which occur in system 110. Typically, a sender device introduces new events to an event manager 234 transport mechanism. Event manager 234 then dispatches the events to their intended destinations and oversees the routing and processing of the events.

Figure 3:
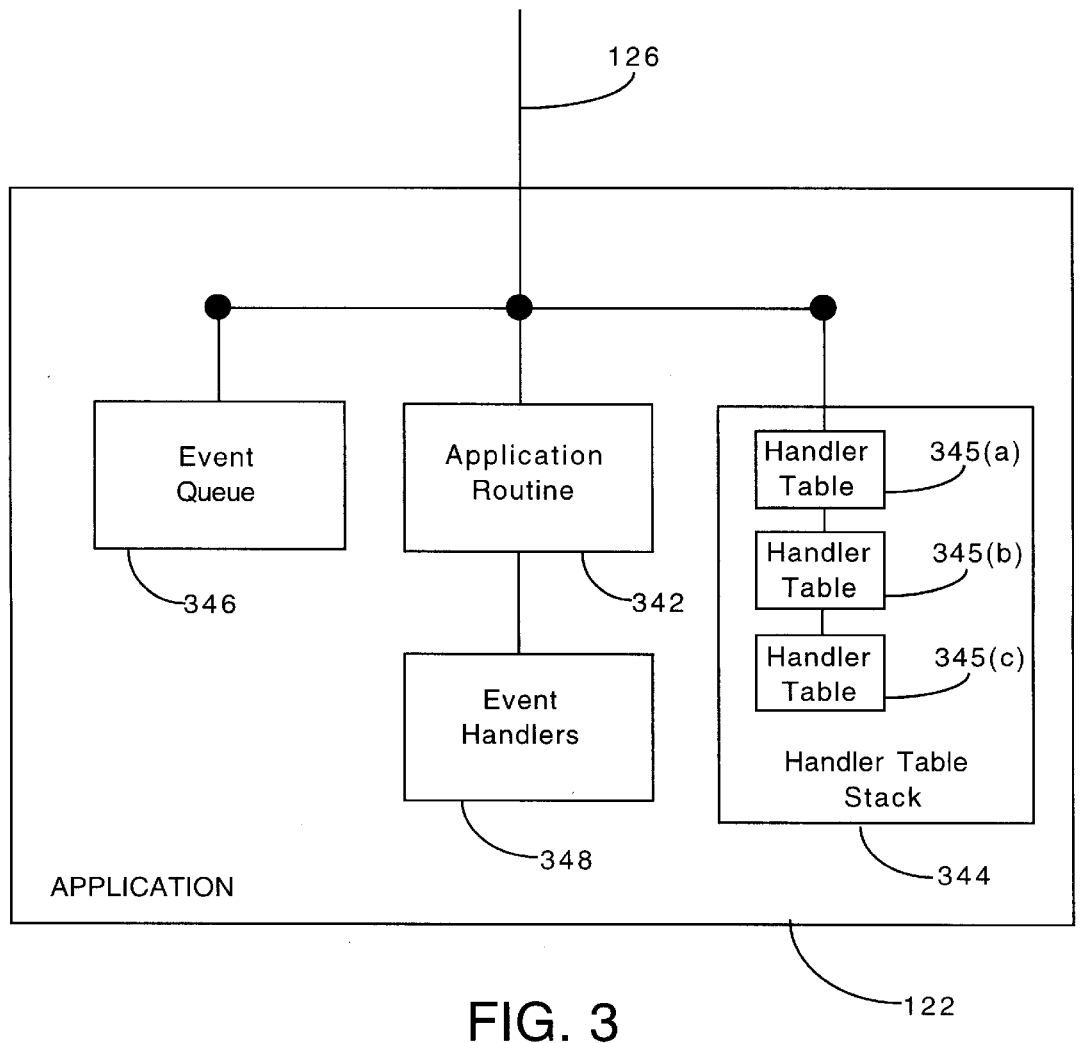
FIG. 3 is a block diagram showing the preferred embodiment of the FIG. 1 application.

Referring now to FIG. 3, a block diagram of the preferred embodiment of application 122 is shown. Application 122 includes application routine 342, handler table stack 344, event queue 346, and event handlers 348. Application routine 342 is a program of instructions typically intended to perform a specified task (for example, word processing or generating a spreadsheet) using computer system 110.

In the preferred embodiment, application 122 registers selected events of interest which may occur in system 110. The registrations of interest are compiled into various handler tables 345(*a*) through 345(*c*) which then constitute handler table stack 344. Event manager 234 then dispatches a given event sequentially through the various handler tables 345 contained in handler table stack 344 to determine whether the given event is registered. In alternate embodiments a varying number of handler tables 345 may be present in handler table stack 344.

Event queue 346 is a series of memory locations for temporary storage of certain filtered events. Handler tables 345 may be either filtering or non-filtering. A current non-filtering handler table 345 permits event manager 234 to dispatch new events to the next handler table 345 in handler table stack 344 whenever the new events are not registered in the current non-filtering handler table 345. In contrast, a current filtering handler table 345 requires event manager 234 to dispatch new events to event queue 346 whenever the new events are not registered in the current filtering handler table 345.

Therefore, when a current handler table 345 is of the filtering type and a particular event is not registered in the current handler table 345, then the particular event is placed in event queue 346 for later processing (for example, if a print request is not registered in the current handler table 345, then the print request may be placed in event queue 346, so that application. 122 may later respond to the print request at a time when events preceding the print request have been dispatched and handled).

Event handlers 348 are a series of separately invocable subroutines which specify how application 122 ultimately processes new events which are registered in handler table stack 344. Event handlers 348 correspond to the various specific types of events and therefore typically have numerous different implementations depending upon the specific event which is being handled. Examples of handled events include, but are not limited to, user input initiated using various input devices (such as a keyboard 116 or mouse 118), operating system messages instructing application 122 to quit, and communications from other applications requesting information from application 122.

Figure 4:
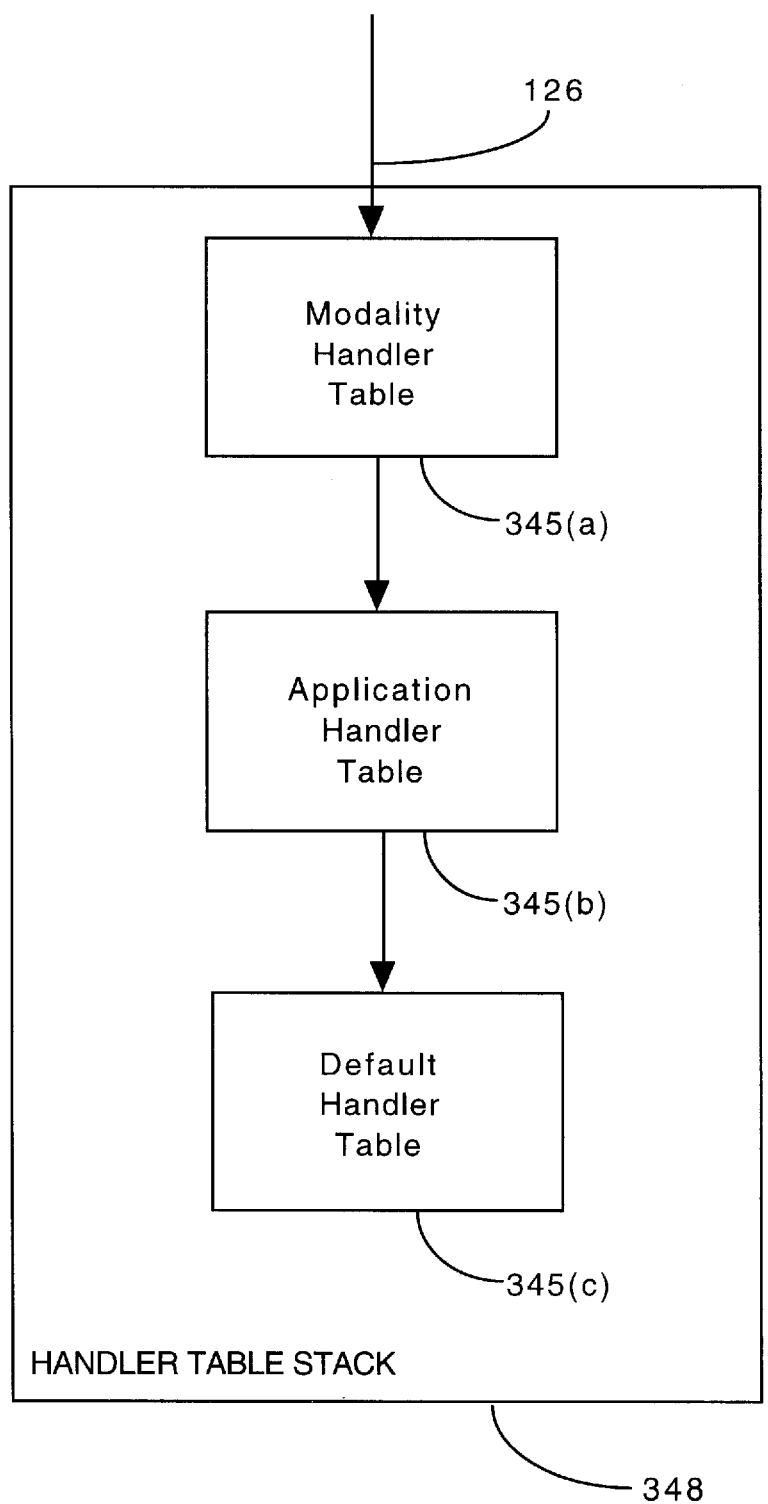
FIG. 4 is a block diagram showing the preferred embodiment of the handler table stack according to the present invention.

Referring now to FIG. 4, a block diagram of the preferred embodiment of handler table stack 344 is shown. In the preferred embodiment, handler table stack 344 includes modality handler table 345(*a*), application handler table 345(*b*) and default handler table 345(*c*). In alternate embodiments, handler table stack 344 may include various other types and quantities of handler tables 345 (for example, application 122 may configure various handler tables 345 to correspond to a number of different modalities).

Event manager 234 receives and dispatches each new event to handler table stack 344. In the preferred embodiment, event manager 234 initially dispatches new events to a modality handler table 345(*a*) that corresponds to a particular modality and limits the type of events to which application 122 can respond. For example, modality handler table 345(*a*) may correspond to a modality in which application 122 is waiting for a specific user response to a dialog box question. A particular example of such a dialog box response might occur when application 122 is attempting to open a file which is known by application 122 to be stored on a diskette. A dialog box will appear on video monitor 114 with the instructions "Please insert (disk name)." In the foregoing example, modality handler table 345(*a*) will contain a subset of events corresponding to the dialog box, thus limiting the types of events which can be handled using this particular modality handler table 345(*a*).

If the new event is registered in modality table 345(*a*), then event manager 234 dispatches the event to a corresponding event handler 348 which is also registered in modality table 345(*a*). Conversely, if the new event is not registered in modality table 345(*a*), then event manager 234 may dispatch the event to one of two different possible destinations. If modality table 345(*a*) is a filtering type handler table 345, event manager 234 dispatches the new event to event queue 346 for temporary storage until application 122 can process the event. If modality table 345(*a*) is not of the filtering type, event manager 234 dispatches the new event to application handler table 345(*b*) which is the next handler table 345 in the predetermined sequence.

Application 122 registers selected events of interest into application handler table 345(*b*) and thereby indicates to event manager 234 the types of events which application 122 can handle under normal operating conditions. If the new event is registered in application table 345(*b*), then application 122 handles the event with a corresponding event handler 348 which is listed in application table 345(b). Conversely, if the new event is not registered in application table 345(b), then event manager 234 dispatches the event to default handler table 345(c) (unless application table 345(b) is the filtering type, in which case the event goes to event queue 346).

Default handler table 345(c) defines default behavior in case the incoming event is not handled by either the modality table 345(a) or application table 345(b). If the incoming event is registered in default table 345(c), then application 122 handles the event with a corresponding event handler 348 which is listed in default table 345(c). Conversely, if the incoming event is not registered in default table 345(c), then event manager 234 terminates the dispatching procedure (unless default table 345(c) is a filtering type handler table 345, in which case the event goes to event queue 346). In this manner, event manager 234 sequentially examines each handler table 345 in handler table stack 348 to determine whether application 122 has registered interest in the new event.

In the present invention, specified program instructions permit application 122 and/or operating system 120 to create and manipulate handler tables 345. Furthermore, application 122 and/or operating system 120 may likewise manipulate handler table stack 344 by inserting and/or removing various handler tables 345. For example, application 122 may support various different modalities by creating or selecting an appropriate handler table 345 and positioning it as modality handler table 345(a).

Figure 5:
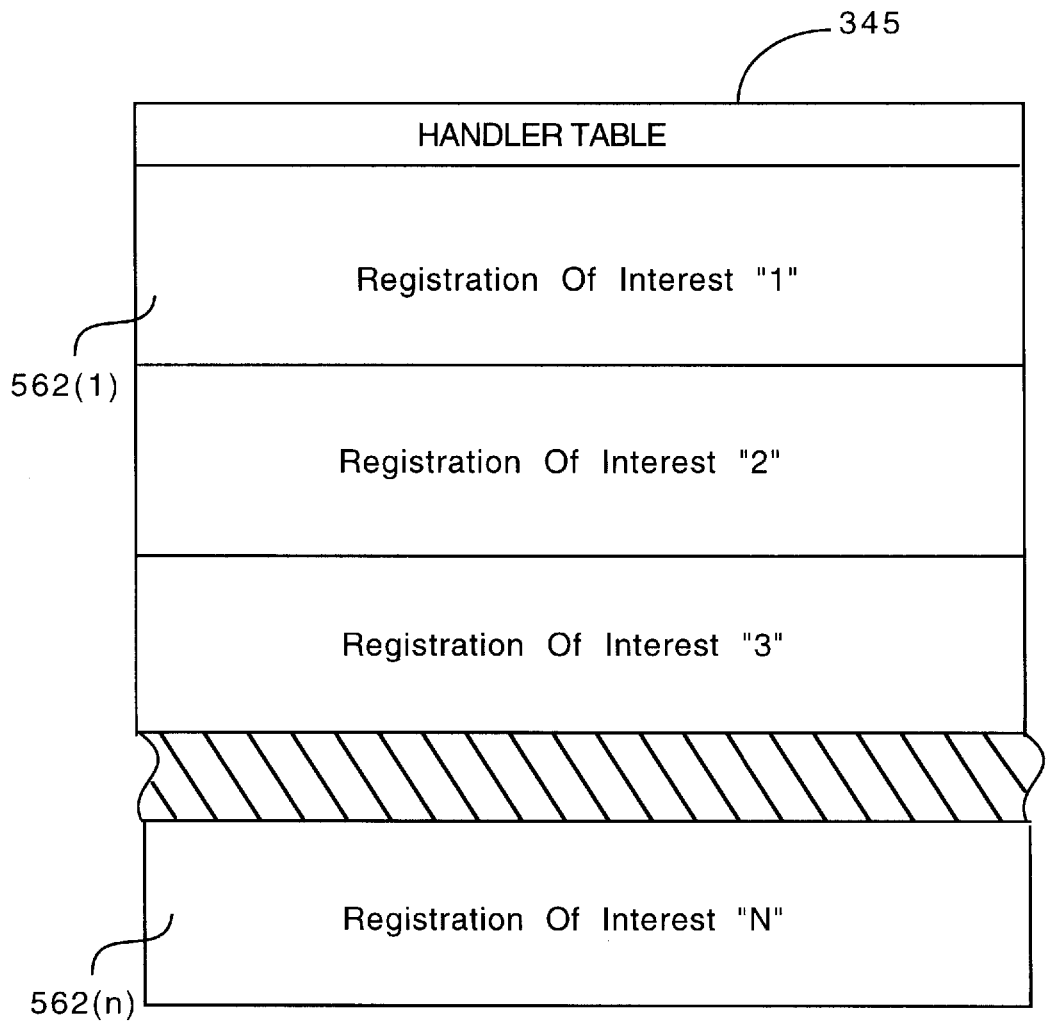
FIG. 5 is a block diagram of a model handler table according to the present invention.

Referring now to FIG. 5, a block diagram of an exemplary handler table 345 is shown. Handler table 345 typically contains a collection of selected registrations of interest 562(l) through 562(n). In the preferred embodiment, application 122 registers a selected specification of an event and a corresponding specification of a handler to form each registration of interest 562(l) through 562(n) and also creates and manipulates the registrations of interest 562(l) through 562(n) to form various handler tables 345. Each handler table 345 may contain a variable number of registrations of interest 562(l) through 562(n).

Application 122 may selectively insert, alter or delete the registrations of interest 562 to create various specific handler tables 345 which may be required for particular functions or operations. Application 122 may also arrange and rearrange the handler tables 345 in various predetermined sequences, thereby configuring handler table stack 344 according to various demands and requirements of application 122.

Figure 6:
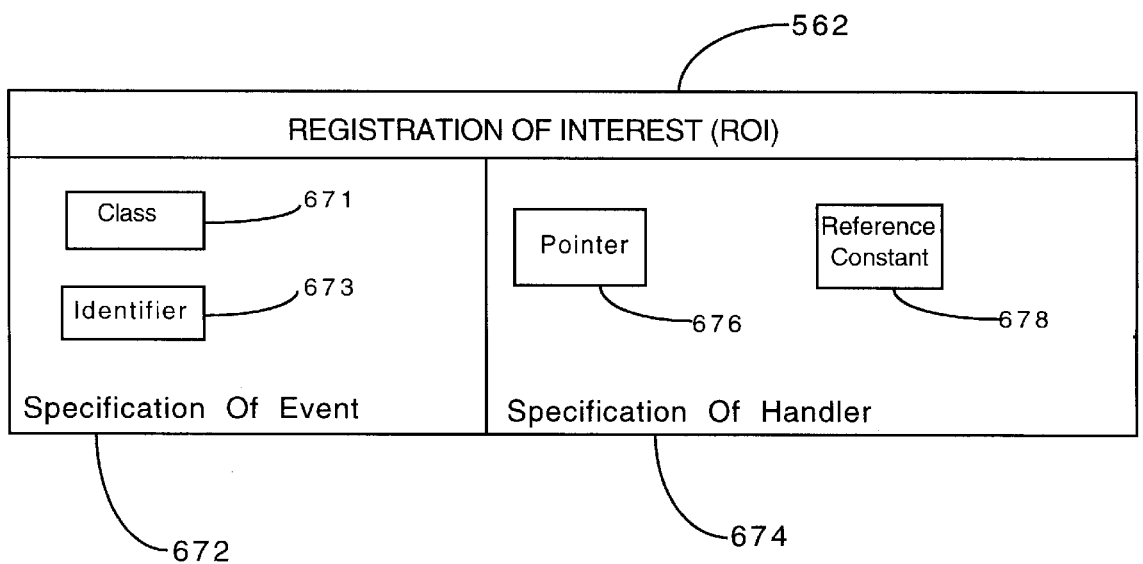
FIG. 6 is a block diagram showing the preferred embodiment of the FIG. 5 registration of interest.

Referring now to FIG. 6, a block diagram of the preferred embodiment of the registration of interest 562 is shown. The registration of interest 562 includes a specification of event 672 and a specification of handler 674. In the preferred embodiment, specification of event 672 includes an event class 671 (e.g., mouse or keyboard), and an event identifier 673 (e.g., click or down).

In the preferred embodiment, each specification of handler 674 typically includes a pointer 676 to an event handler 348 routine which corresponds to the related registration of event 672 in registration of interest 562. The registration of handler 674 may also contain a reference constant 678 identifying the particular registration of interest 562 to which the referenced event handler 348 corresponds.

Figure 7:
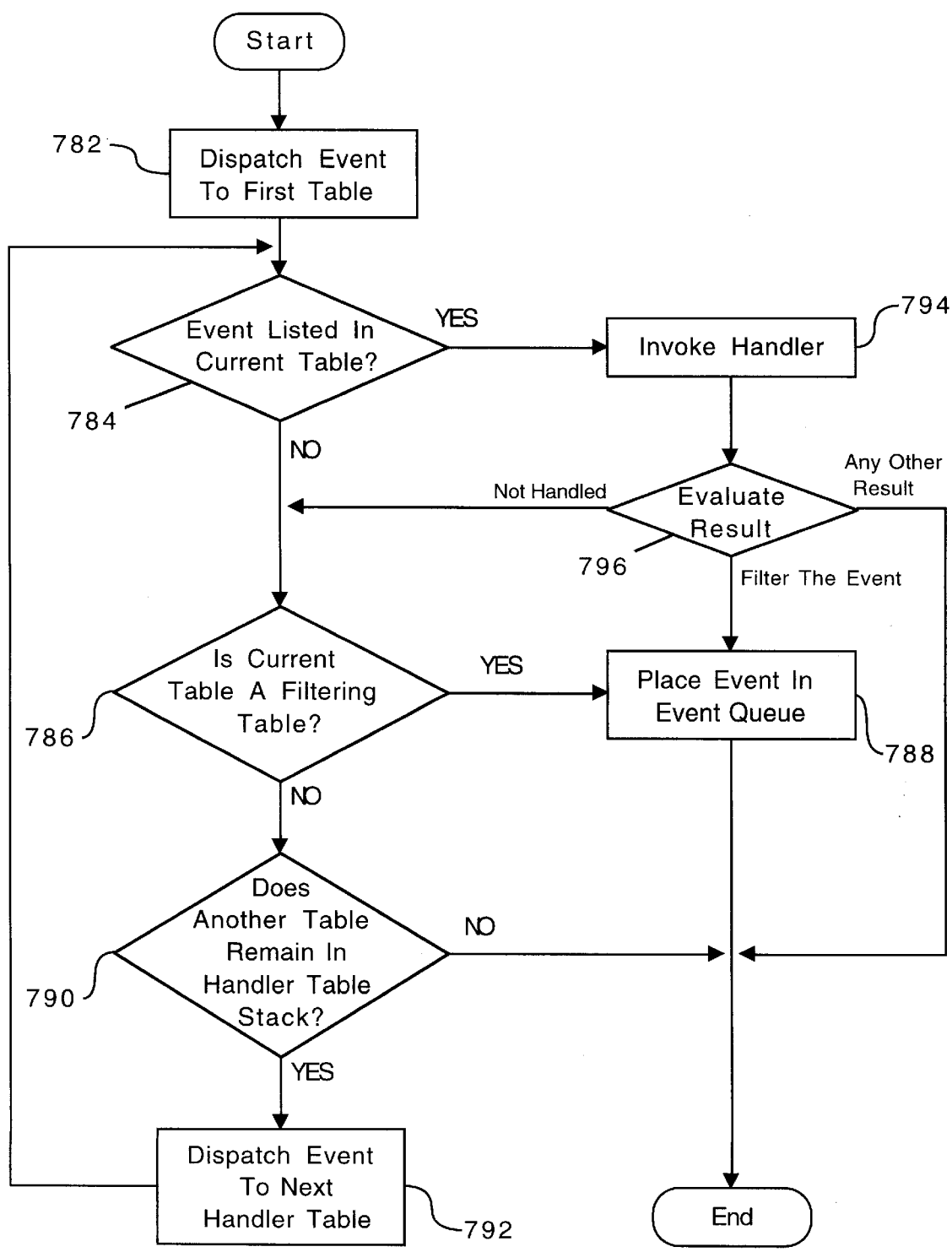
FIG. 7 is a flowchart showing method steps for collecting and dispatching a selected event in a computer application program according to the present invention.

Referring now to FIG. 7, a flowchart of method steps for handling a selected event in a computer application program is shown. In step 782, event manager 234 dispatches a new event to the topmost handler table 345(a) in the sequence within handler table stack 344. Event manager 234, in step 784, then determines whether the new event is listed in the current handler table 345.

If the event is not listed, event manager 234, in step 786, determines whether the current handler table 345 is a filtering table. In step 788, if the current handler table 345 is a filtering table, the event is placed in event queue 346 to await further processing and the FIG. 7 process ends. However, if the current event handler table 345 is not a filtering table, event manager 234, in step 790, determines whether another handler table 345 remains in handler table stack 344. If no other handler tables 345 remain, the FIG. 7 process ends. However, if at least one other handler table 345 remains within handler table stack 344, event manager 234, in step 792, dispatches the event to the next handler table 345. The FIG. 7 process then loops back to step 784 and repeats itself using an updated current handler table 345 which is the next handler table 345 in the sequence within handler table stack 344.

If event manager 234 ever determines, in step 784, that the new event is listed in the current handler table 345, then event manager 234, in step 794, invokes the event's corresponding event handler 348 subroutine by using the specification of handler 674 contained in the related registration of interest 562. The corresponding event handler 348 then handles the new event in accordance with the particular subroutine code which was designed to handle the particular type of event in question.

Event handler 348, as part of its invocation procedure, may generate various status results. In step 796, event manager 234 then accesses and evaluates the event handler 348 status result. The status result is typically a numerical value which translates into some specific action based on the event manager 234 protocol. If the status result translates as "not handled", then the event (or something in the event) was not understood or event handler 348 arbitrarily chose not to handle the event. A "not handled" status result is effectively the same as finding no listing in the current handler table 345 in step 784. In response to a "not handled" status result in step 796, event manager 234 returns the FIG. 7 process to step 786.

If event manager 234, in step 796, determines that the generated status result translates as "filter the event", then event manager 234, in step 788, places the event into event queue 346 to await processing and the FIG. 7 process ends. If event manager 234, in step 796, determines that the status result translates as anything other than "not handled" or "filter the event", then the FIG. 7 process ends and the present invention has successfully handled the received event.

The invention has been explained above with reference to a preferred embodiment. Other embodiments will be apparent to those skilled in the art in light of this disclosure. For example, the handler table stack 344 may include various other types and quantities of handler tables in addition to those described in the preferred embodiment above. Therefore, these and other variations upon the preferred embodiments are intended to be covered by the present invention, which is limited only by the appended claims.

What is claimed is:

1. An apparatus for handling events in a computer system, comprising:

an application routine for selectively registering subsets of events to form one or more handler tables arranged into a handler table stack;

an event manager for determining whether a new event is registered in said one or more handler tables;

one or more event handlers for responsively handling said new event which is determined to be registered in said one or more handler tables, said event manager placing said new event in an event queue when said new event is not listed in one of said handler tables but said table is a filtering table, and said event manager dispatching said new event to another of said handler tables when said new event is not listed in said first handler table and said table is not a filtering table.

2. The apparatus of claim 1 wherein said event manager determines whether said new event is registered by sequentially examining each of said one or more handler tables in a sequence.

3. The apparatus of claim 2 wherein said event manager selectively filters said new event into a temporary event queue if said new event is not registered.

4. The apparatus of claim 2 wherein said application routine selectively configures said one or more handler tables by altering said subsets of said events.

5. The apparatus of claim 1 wherein said application routine registers a pointer for each of said one or more event handlers, said pointer corresponding to at least one of said events registered in said one or more handler tables.

6. A method for handling events in a computer application program comprising the steps of:

registering subsets of said events and their respective handling procedures to form a plurality of handler tables arranged into a handler table stack;

determining whether a new event is registered in a first of said plurality of handler tables;

handling said new event with a corresponding one of said handling procedures when said new event is registered;

determining whether said first handler table is a filtering table when said new event is not registered; and dispatching said new event to a second handler table when said new event is not registered and said first handler table is not a filtering handler table.

7. The method of claim 6 wherein said step of determining is performed by separately examining each of said plurality of handler tables in sequence.

8. The method of claim 7 further comprising the step of selectively filtering said new event into a temporary event queue if said new event is not registered.

9. The method of claim 7 further comprising the step of selectively configuring said plurality of handler tables by altering said subsets of said events and by altering said sequence of said plurality of handler tables.

10. The method of claim 6 wherein the step of registering said handling procedures is performed using a pointer for each of said handling procedures, said pointer corresponding to a specific one of said handling procedures.

11. A computer-readable medium containing instructions which cause a computer system to handle selected events by performing the steps of:

registering subsets of said events and their respective handling procedures to form one or more handler tables arranged into a handler table stack;

determining whether a new event is registered in said one or more handler tables;

invoking a handler when said new event is registered in one of said handler tables;

determining whether said handler table is a filtering table when said new event is not registered in said handler table; and placing said new event in an event queue when said handler table is a filtering table and said new event is not registered in said handler table.

12. The computer-readable medium of claim 11 wherein said step of determining is performed by separately examining each of said one or more handler tables in a sequence.

13. The computer-readable medium of claim 12 further comprising the step of selectively filtering said new event into a temporary event queue if said new event is not registered.

14. The computer-readable medium of claim 12 further comprising said one or more handler tables by altering said subsets of said events.

15. The computer-readable medium of claim 11 wherein the step of registering said handling procedures is performed using a pointer for each of said handling procedures, said pointer corresponding to a specific one of said handling procedures.

16. An apparatus for handling events in a computer system, comprising:

means for registering subsets of said events and their respective handling procedures to form a plurality of handler tables arranged into a handler table stack;

means for determining whether a new event is registered in a first of said plurality of handler tables;

means for handling said new event with a corresponding one of said handling procedures when said new event is registered;

means for determining whether said first handler table is a filtering table when said new event is not registered; and means for dispatching said new event to a second handler table when said new event is not listed in said first handler table and said first handler table is not a filtering table.

17. The apparatus of claim 16 wherein said means for determining determines whether said new event is registered by separately examining each of said plurality of handler tables in a sequence.

18. The apparatus of claim 17 wherein said means for determining selectively filters said new event into a temporary event queue if said new event is not registered.

19. The apparatus of claim 17 wherein said means for registering selectively configures said plurality of handler tables by altering said subsets of said events and by altering said sequence of said plurality of handler tables.

20. The apparatus of claim 16 wherein said means for registering assigns a pointer for each of said handling procedures, said pointer corresponding to a specific one of said handling routines.

* * * * *